US006684529B2

(12) United States Patent
Morris et al.

(10) Patent No.: US 6,684,529 B2
(45) Date of Patent: Feb. 3, 2004

(54) MANUAL DRYER UNIT FOR SELF-SERVICE CAR WASH

(75) Inventors: James T. Morris, 15677 Blackfeather Dr., Olathe, KS (US) 66062; Dennis D. Evans, Independence, MO (US); Duane A. Kent, Holt, MO (US)

(73) Assignee: James T. Morris; part interest ( * ) Notice: Subject to any disclaimer, the term of this patent is extended or adjusted under 35 U.S.C. 154(b) by 0 days.

(21) Appl. No.: 10/086,850

(22) Filed: Feb. 28, 2002

(65) Prior Publication Data

US 2002/0129515 A1 Sep. 19, 2002

Related U.S. Application Data

(60) Provisional application No. 60/272,225, filed on Feb. 28, 2001.

(51) Int. Cl.[7] .................................................. F26B 25/06
(52) U.S. Cl. ............................. 34/666; 34/218; 34/229; 285/276
(58) Field of Search ........................... 34/666, 229, 243, 34/218; 137/615; 285/276

(56) References Cited

U.S. PATENT DOCUMENTS

| 3,742,615 | A | * | 7/1973 | Capra .......................... 34/229 |
| 3,787,986 | A | * | 1/1974 | Burger ......................... 34/229 |
| 4,653,417 | A | * | 3/1987 | White .......................... 114/91 |
| 4,817,301 | A |   | 4/1989 | Belanger et al. |
| 5,538,296 | A | * | 7/1996 | Horton ........................ 285/276 |
| 5,620,157 | A | * | 4/1997 | Titzer .......................... 248/58 |
| 5,755,043 | A | * | 5/1998 | Belanger et al. ............... 34/666 |
| 5,950,331 | A | * | 9/1999 | Coggins et al. ............... 34/666 |
| 6,286,228 | B1 | * | 9/2001 | Bodnar et al. ................. 34/61 |

* cited by examiner

Primary Examiner—Henry Bennett
Assistant Examiner—Camtu Nguyen
(74) Attorney, Agent, or Firm—Hovey Williams LLP

(57) ABSTRACT

A manually operated vehicle blow-drying device having a swingable overhead boom and an air supply hose extending down from a distal end of the boom.

18 Claims, 6 Drawing Sheets

MANUAL DRYER UNIT FOR SELF-SERVICE CAR WASH

RELATED APPLICATIONS

This application claims the priority benefit under 35 U.S.C. Section 119(e) of U.S. Provisional Patent Application Ser. No. 60/272,225, filed Feb. 28, 2001, the entire disclosure of which is incorporated herein by reference.

BACKGROUND OF THE INVENTION

1. Field of the Invention

The present invention relates generally to systems for cleaning vehicles. In another aspect, the invention concerns a manually operated blow-drying device for removing moisture from the surface of a vehicle.

2. Description of the Prior Art

After washing a vehicle, it is desirable to remove the excess water from the vehicle in order to prevent spotting caused by dirt or other materials present in the water droplets on the surface of the vehicle. Many automated vehicle washing systems include an automatic dryer station which removes moisture from the surface of the vehicle as it is driven under the dryer. This type of automatic dryer system is typically mounted on the floor of an automated car wash bay. After the vehicle has been washed, the vehicle passes under the dryer system where high velocity air is blown in an oscillating pattern across the vehicle, thereby removing moisture from its surface.

Although vehicle blow-drying devices have been employed in automatic car washes for years, no suitable equivalent exists for manually blow-drying a vehicle. Currently, in order to dry a manually washed vehicle, the moisture on the surface of the vehicle must be manually wiped using a towel, shammy, or other wiping device. Such manual wiping of moisture from the surface of a vehicle can be a time consuming and rather strenuous task.

OBJECTS AND SUMMARY OF THE INVENTION

Accordingly, it is an object of the present invention to provide a manually operated blow-drying device which can be used to dry the surface of a vehicle.

A further object of the present invention is to provide a manually operated blow-drying device for drying a vehicle without any physical contact between the blow-drying device and the surface of the vehicle.

A still further object of the present invention is to provide a manually operated vehicle blow-drying device that discharges heated air to aid in removal of moisture from the surface of the vehicle.

Another object of the present invention is to provide a manually operated vehicle blow-drying device that is easy to install and operate in existing manual car wash facilities.

Still another object of the present invention is to provide a manually operated vehicle blow-drying device which includes a flow-through swivel joint which allows air to pass through the joint while the joint provides for pivotal movement of the boom.

Yet another object of the present invention is to provide a manually operated vehicle blow-drying device employing a handle that allows the operator to move freely around the vehicle while drying the vehicle's surface without kinking of the air supply hose.

It should be noted that not all of the above-listed objects need be accomplished by the invention described and claimed herein. Other objects and advantages of the invention will be apparent from the detailed description, claims, and drawing figures.

In accordance with one embodiment of the present invention, there is provided a manually operated blow-drying device for drying a vehicle. The blow-drying device comprises an overhead support assembly, a hose, a blower, and a handle. The hose is coupled to the support assembly and extends generally downwardly therefrom. The blower is fluidically coupled to the base end of the hose and is operable to force air through the hose and out of the distal end of the hose. The handle is coupled to the distal end of the hose and is operable to aid in manual manipulation of the hose.

In accordance with another embodiment of the present invention, there is provided a manually operated blow-drying device for drying vehicles. The blow-drying device comprises an upright support structure, a support housing, an elongated boom, a hose, a blower, and a handle. The upright support structure has a lower portion rigidly coupled to the ground and an upper portion which extends at least five feet above the ground. The support housing is rigidly coupled to the upper portion of the support structure. The boom is pivotally coupled to the support housing and extends laterally therefrom. The hose has an attached portion extending along and coupled to the boom and a detached portion extending generally downwardly from the boom. The blower is positioned in the support housing and fluidically connected to the hose. The blower is operable to force air into a base end of the hose. The handle is coupled to a distal end of the hose and is operable to aid in manual manipulation of the distal end of the hose.

In accordance with a still further embodiment of the present invention, there is provided a vehicle cleaning system comprising a support housing, an air displacement assembly, a flow-through swivel joint, an elongated overhead boom, and a hose. The support housing defines a protected interior space and an outlet opening. The air displacement assembly is received in the protected interior space and is operable to displace air through the outlet opening. The swivel joint has an open inner collar, a concentric outer collar, and a ball bearing. The open inner collar is rigidly coupled to the support housing and is positioned over the outlet opening so that air flowing through the outlet opening flows through the inner collar. The outer collar is concentrically disposed generally around the inner collar. The bearing is positioned generally between the inner and outer collars and is operable to reduce frictional resistance to the rotation of the outer collar relative to the inner collar. The boom has a proximal boom end rigidly coupled to the outer collar and a distal boom end horizontally spaced from the support housing. The hose has an attached portion coupled to and extending along the boom and a detached portion extending generally downwardly from the distal boom end. The hose is connected in fluid flow communication with the outlet opening.

In accordance with still another embodiment of the present invention, a method of drying a vehicle is provided. The method generally comprises the steps of: (a) actuating a blower which forces air through a hose; (b) manually grasping a handle coupled to a detached portion of the hose; (c) pivoting an overhead boom to which an attached portion of the hose is coupled by manually moving the handle; and (d) discharging air out of the detached portion of the hose and onto a vehicle, thereby drying the vehicle.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENT

Figure 1:
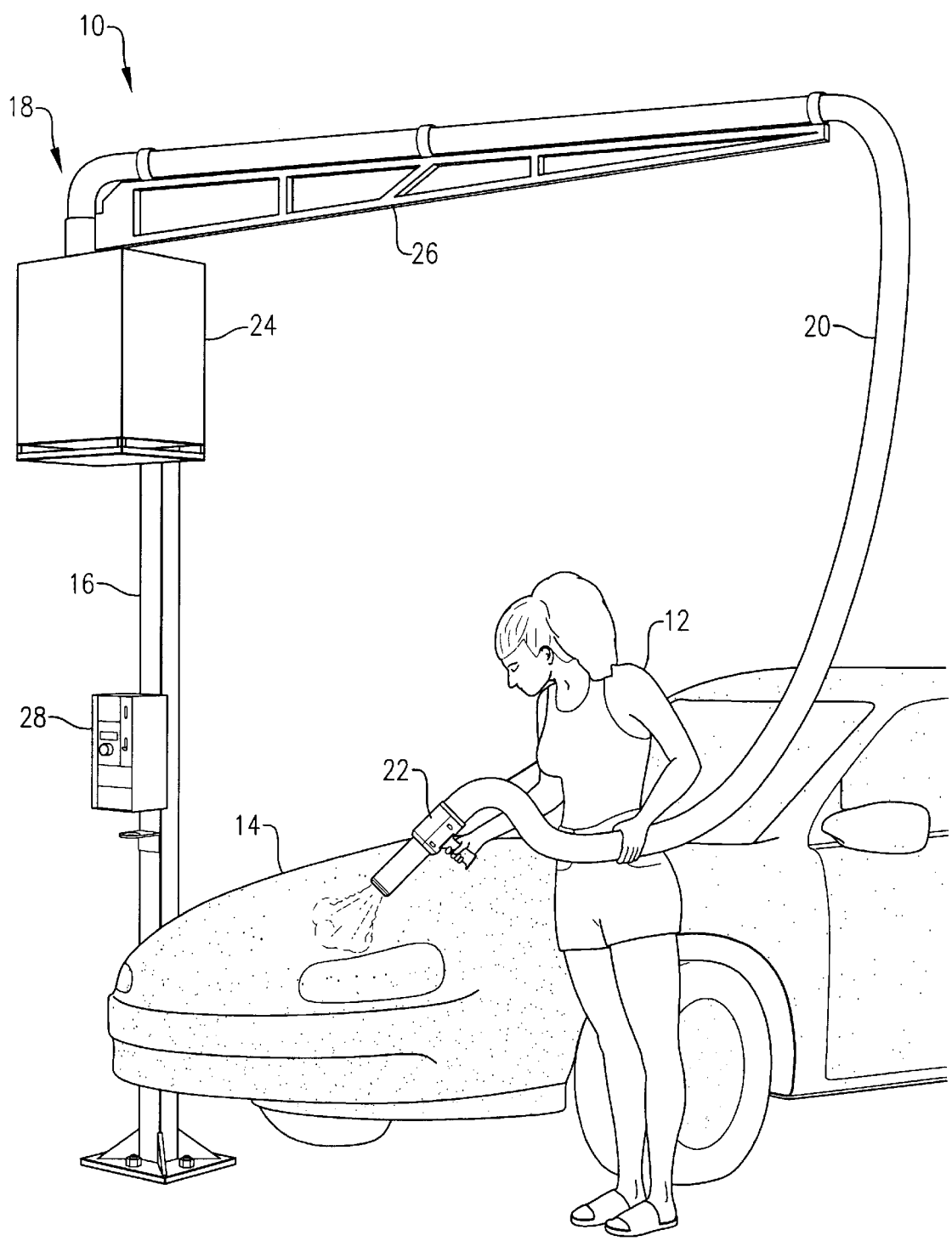
FIG. 1 is a perspective view of a manually operated vehicle blow-drying device constructed in accordance with the principles of the present invention, particularly illustrating the blow-drying device in an operational mode with an operator drying a vehicle.

Referring initially to FIG. 1, a vehicle blow-drying device 10 is illustrated in an operational mode with an operator 12 using blow-drying device 10 to dry a vehicle 14. Vehicle blow-drying device 10 generally comprises an upright support structure 16, an overhead support assembly 18, an air supply hose 20, and an air discharge gun 22. Overhead support assembly 18 comprises a support housing 24, which is rigidly coupled to upright support structure 16, and an elongated boom 26, which is pivotally coupled to support housing 24 and extends over vehicle 14. Support housing 24 houses a blower which forces air through hose 20 and out of discharge gun 22. A timer control assembly 28 is coupled to upright support structure 16 and is operable to switch the blower in support housing 24 on and off.

In operation, the blower can be turned on by operator 12 using timer control assembly 28. While blower is forcing air through hose 20, operator 12 can grasp air discharge gun 22 and aim the discharged air at vehicle 14 to remove water therefrom. In order to easily manipulate air discharge gun 22 around vehicle 14, operator can simply pull on hose 20 and/or air discharge gun 22 to cause boom 26 to pivot relative to support housing 24 and swing over vehicle 14.

Figure 2:
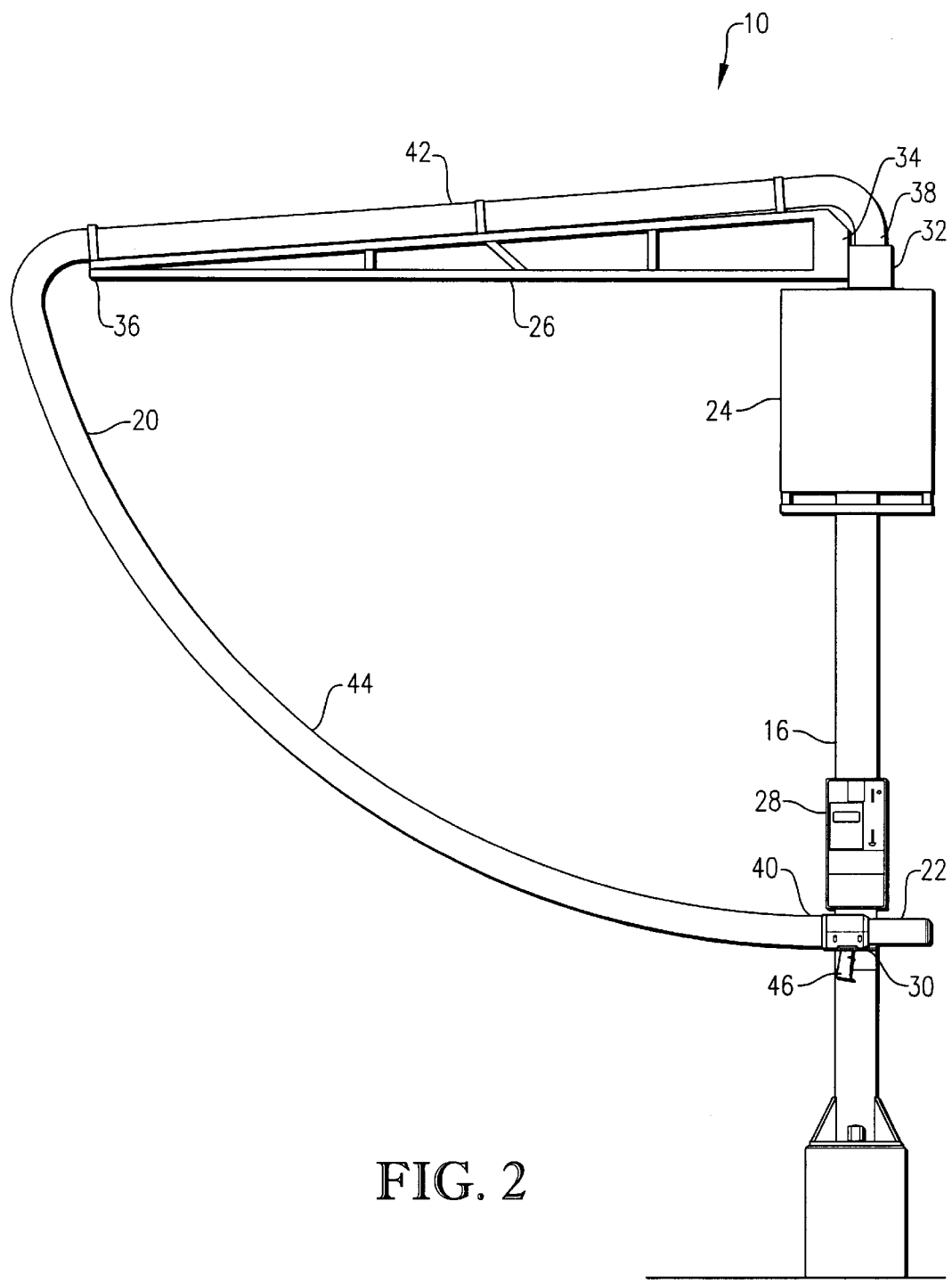
FIG. 2 is a side view of the blow-drying device, particularly illustrating the device in a non-operational mode with the boom and gun being in their resting positions.

Referring now to FIG. 2, vehicle blow-drying device 10 is illustrated in a nonoperational position with air discharge gun 22 being received in a holster 30 coupled to upright support structure 16 and boom 26 being in a resting position to which it automatically returns after use.

The pivoting of boom 26 relative to support housing 24 is provided by a flow-through swivel joint 32. Flow-through swivel joint 32 includes a first member rigidly coupled to an upper portion of support housing 24 and a second member rigidly coupled to aproximal boom end 34 of boom 26. Flow-through swivel joint 32 allows boom 26 to swing relative to support housing 24 on a boom pivot axis. Preferably, the boom pivot axis is slightly skewed from vertical so that when vehicle blow-drying device 10 is not in use, boom 26 automatically pivots into a predetermined resting position by gravitational force. Boom 26 extends substantially horizontally from flow-through swivel joint 32 so that a distal boom end 36 of boom 26 is laterally spaced from support housing 24. Preferably, boom 26 is supported solely by support housing 24 in a cantilever fashion.

Air supply hose 20 includes a base end 38 coupled to flow-through swivel joint 32 and a distal end 40 coupled to air discharge gun 22. An attached portion 42 of air supply hose 20 extends along and is coupled to boom 26, while a detached portion 44 of air supply hose 20 extends generally downwardly from distal boom end 36. Detached portion 44 of hose 20 is made of a flexible material which allows distal end 40 of hose 20 to be easily manipulated through a broad range of motions relative to distal boom end 36. It is preferred for distal end 40 of hose 20 to be coupled to air discharge gun 22 in a manner such that a handle 46 of air discharge gun 22 can be rotated relative to distal end 40 of hose 20, thereby preventing kinking of air supply hose 20 as air discharge gun 22 is manipulated relative to boom 26.

Upright support structure 16 includes a lower portion rigidly coupled to the ground and an upper portion which extends at least five feet above the ground. Support housing 24 is rigidly coupled to the upper portion of upright support structure 16 in a manner such that support housing 24 is at least five feet above the ground. Preferably, support housing is supported at least six feet above the ground, and most preferably at least seven feet above the ground. Such vertical elevation of support housing 24 ensures that boom 26 is positioned high enough to allow vehicles and operators to pass freely thereunder.

Figure 3:
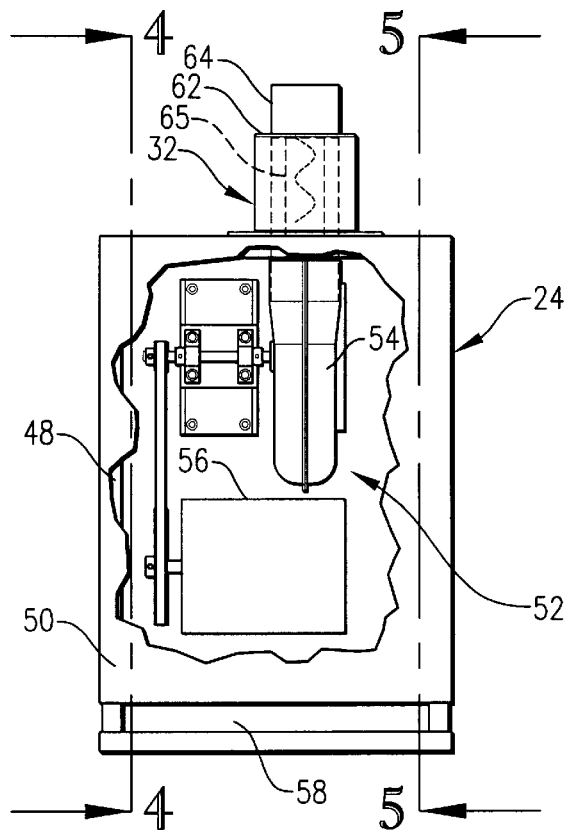
FIG. 3 is a side view of the support housing and swivel joint with certain portions of the support housing being cut-away to illustrate the air displacement assembly disposed in the support housing.
Figure 4:
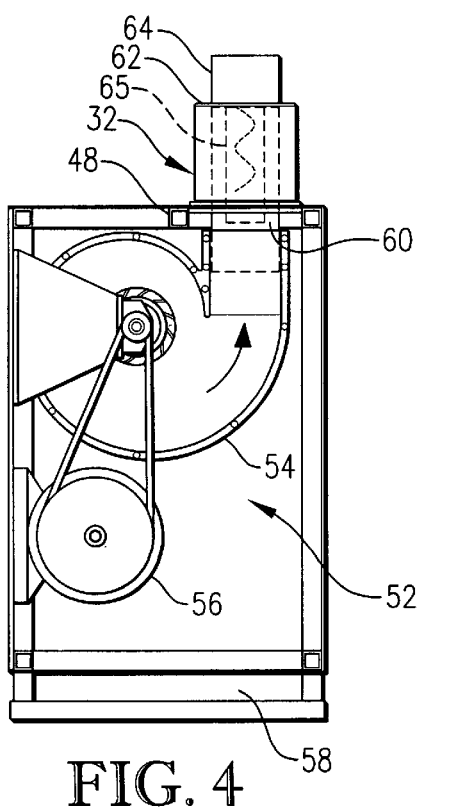
FIG. 4 is a sectional side view taken along line 4—4 in FIG. 3, particularly illustrating the centrifugal fan and electric motor of the air displacement assembly.
Figure 5:
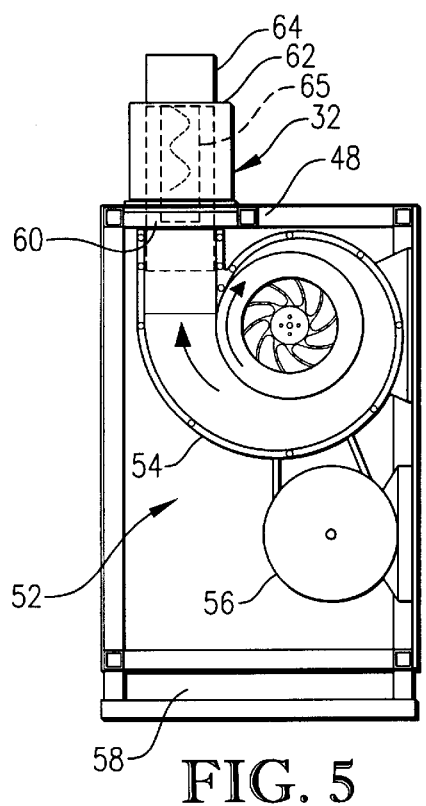
FIG. 5 is a sectional side view taken along line 5—5 in FIG. 3, particularly illustrating the centrifugal fan and electric motor of the air displacement assembly.

Referring now to FIGS. 3–5, support housing 24 generally includes a rigid frame 48 which is at least substantially covered by an outer skin 50. Support housing 24 defines a protected interior space within which an air displacement assembly 52 is received. The air displacement assembly 52 generally includes a centrifugal fan 54 and an electric motor 56 for powering centrifugal fan 54. Support housing 24 defines an inlet opening for allowing outside air to be drawn into support housing 24 by fan 54 and an outlet opening 60 for allowing air to be discharged out of support housing 24. Flow-through swivel joint 32 is positioned over outlet opening 60 and is rigidly coupled to frame 48. Flow-through swivel joint 32 includes an outer collar 62 to which boom 26 (shown in FIG. 2) is rigidly coupled. Outer collar 62 is rotatable on a boom pivot axis relative to support housing 24. Flow-through swivel joint 32 also includes an attachment sleeve 64 rigidly coupled to outer collar 62. Attachment sleeve 64 is adapted to be coupled to air supply hose 20 (shown in FIG. 2). Thus, outside air drawn into support housing 24 through inlet opening 58 by centrifugal fan 54 is forced out of support housing 24 through outlet opening 60 and flow-through swivel joint 32 and into air supply hose 20 (shown in FIG. 2). A heater 65 can be disposed in flow-through swivel joint 32. Heater 65 can be any type of heater (e.g., an electric coil heater) known in the art for heating air flowing there through. It is preferred for outlet opening 60 to be defined in the top portion of support housing 24 50 that boom is elevated relative to support housing 24. It is further preferred for inlet opening 58 to be positioned near the lower portion of support housing 24 in order to prevent a substantial amount of water from entering the protected interior space defined by support housing 24.

Figure 6:
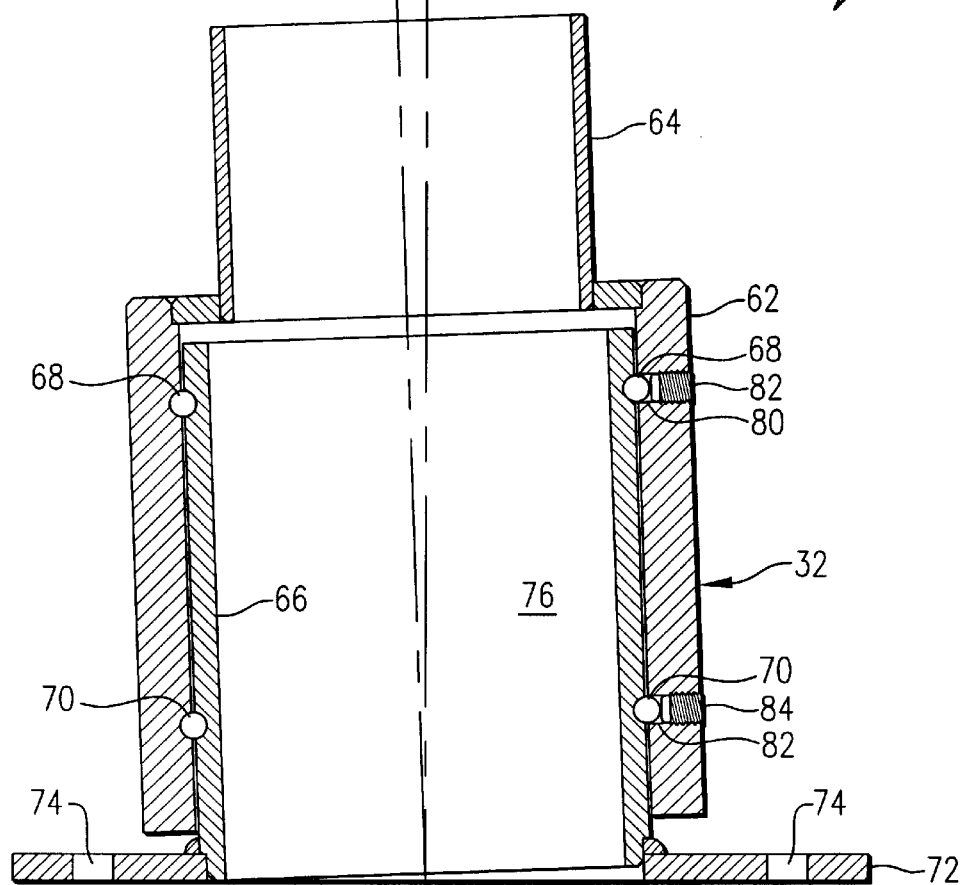
FIG. 6 is a sectional side view of a flow-through swivel joint, particularly illustrating the manner in which the ball bearings are received in the bearing races defined by the inner and outer collars of the joint.

Referring to FIG. 6, flow-through swivel joint 32 generally includes an inner collar 66, outer collar 62, upper and lower ball bearings 68, 70, attachment sleeve 64, and a flange 72. Flange 72 is adapted to be rigidly coupled to support housing 24 (shown in FIGS. 2–5) by extending bolts, or other attachment means, through openings 74 in flange 72. The lower portion of inner collar 66 is rigidly coupled to, or integral with, flange 72. Inner collar 66 is preferably an annular cylindrical member defining a flow-through opening 76 through which air discharged through outlet opening 60 of support housing 24 (shown in FIGS. 2–5) can pass. Outer collar 62 is preferably an annular cylindrical member concentrically disposed around inner collar 66 and having an inner diameter which is marginally greater than the outer diameter of inner collar 66. The outer surface of inner collar 66 and the inner surface of outer collar 62 each include corresponding upper and lower grooves which cooperatively define upper and lower bearing races for receiving upper and lower ball bearings 68, 70, respectively. Upper and lower ball bearings 68, 70 support outer collar 62 relative to inner collar 66 while allowing outer collar 62 to rotate relative to inner collar 66 on a boom pivot axis 78 with minimal frictional resistance. Outer collar 62 defines upper and lower bearing openings 80, 82 through which upper and lower ball bearings 68, 70 can be inserted into the upper and lower bearing races. Once upper and lower ball bearings 68, 70 are received in the upper and lower bearing races, upper and lower cap screws 84, 86 can be threadably received in upper and lower bearing openings 80, 82, thereby keeping upper and lower ball bearings 68, 70 from exiting the upper and lower bearing races via upper and lower bearing openings 80, 82.

Referring now to FIGS. 2 and 6, in order to allow boom 26 to automatically return to a predetermined resting location, it is preferred for boom pivot axis 78 to be skewed from vertical. Such skewing of boom pivot axis 78 can be easily accomplished by tilting inner collar 66 relative to flange 72. Alternatively, boom pivot axis 78 can be tilted by coupling support housing 24 to upright support member of a slight angle from vertical. It is preferred for boom pivot axis 78 to be skewed from vertical by a tilt angle 88 in the range of from about 1 degree to about 5 degrees. Most preferably, tilt angle 88 is about 2 degrees.

Figure 7:
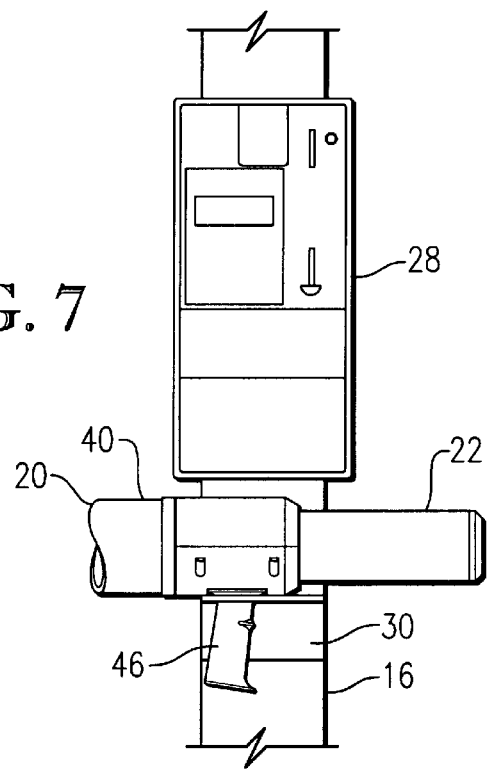
FIG. 7 is a side view of an air discharge gun resting in a holster and a timer control assembly.

Referring to FIG. 7, timer control assembly 28 and holster 30 are preferably rigidly coupled to upright support structure 16. Timer control assembly can be any conventional coin-operated timing switch known in the art. Holster 30 preferably defines an opening therein for receiving handle 46 of air discharge gun 22, thereby keeping air supply hose 20 and air discharge gun 22 from dangling freely from boom 26 (shown in FIG. 2) when not in use.

Figure 8:
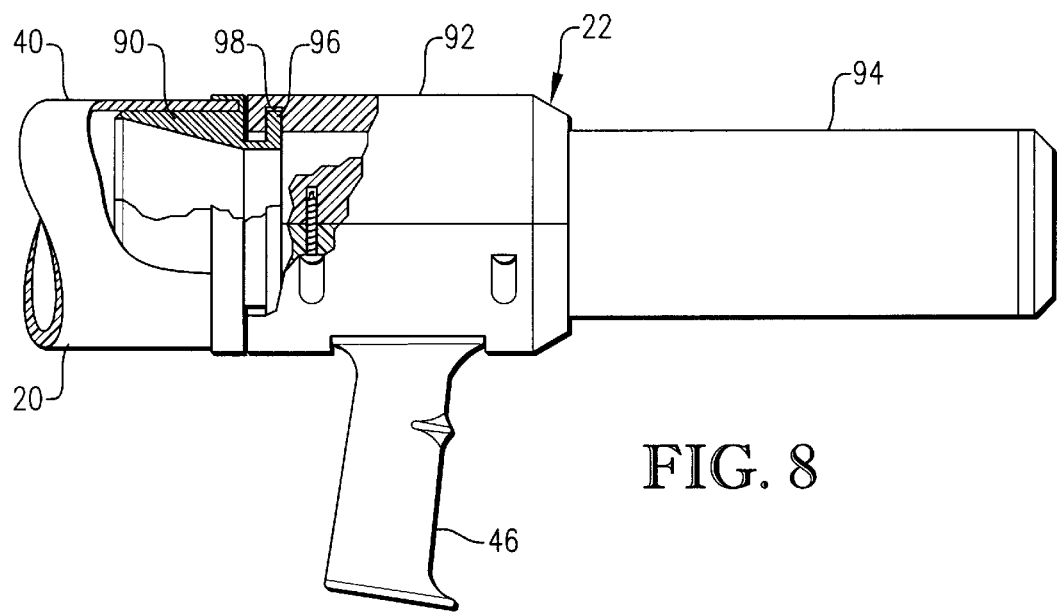
FIG. 8 is a side view of the air discharge gun with certain portions being cut away to better illustrate the hose swivel connection provided by the gun.
Figure 9:
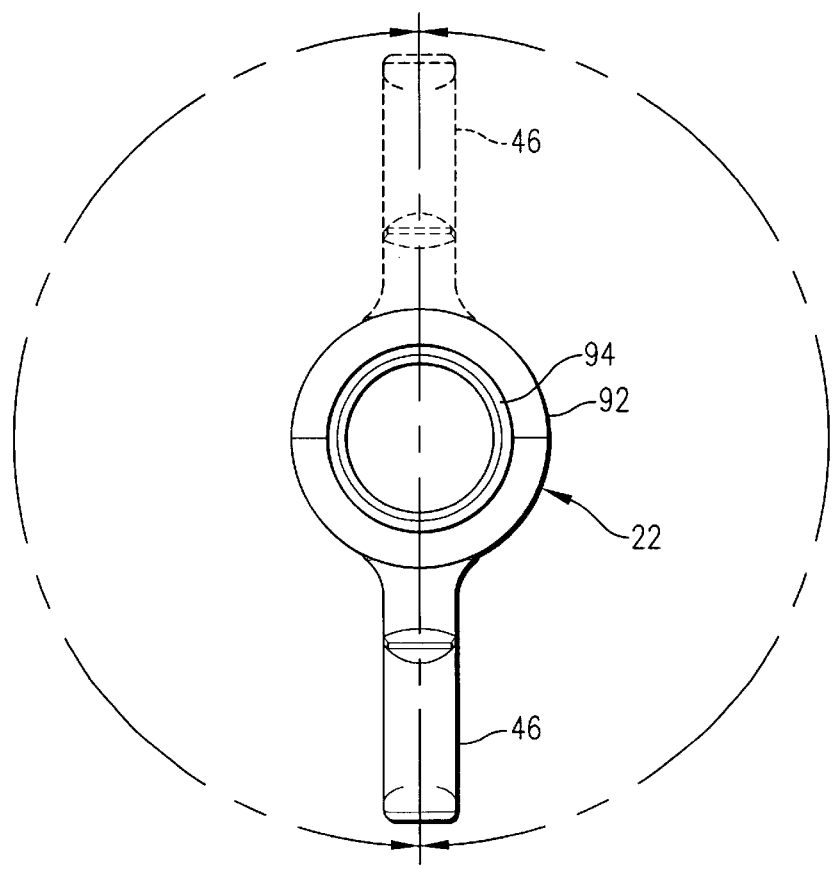
FIG. 9 is an end view of the air discharge gun illustrated in FIG. 8, particularly illustrating the range of motion of the hose swivel connection.

Referring to FIG. 8, air discharge gun 22 generally includes a hose coupling element 90, a main body 92, handle 46, and a nozzle 94. Hose coupling element 90 includes a first end which projects outwardly from main body 92 and is adapted to be rigidly coupled to distal end 40 of air supply hose 20 by any manner known in the art. A second end of hose coupling element 90 presents an outwardly extending flange which is received in an inwardly extending recess 98 of main body 92. Flange 96 and recess 98 allow hose coupling element 90 to be rotated relative to main body 92. Thus, because distal end 40 of air supply hose 20 is rigidly coupled to hose coupling element 90, and handle 46 is rigidly coupled to main body 92, distal end 40 of air supply hose 20 is rotatable relative to handle 46. Nozzle 94 extends outwardly from main body 92 and can be sized to provide the proper exit velocity and flow pattern for air discharged from gun 22. FIG. 9 illustrates that handle 46 of air discharge gun 22 can be freely rotated relative to distal end 40 of air supply hose 20.

Figure 10:
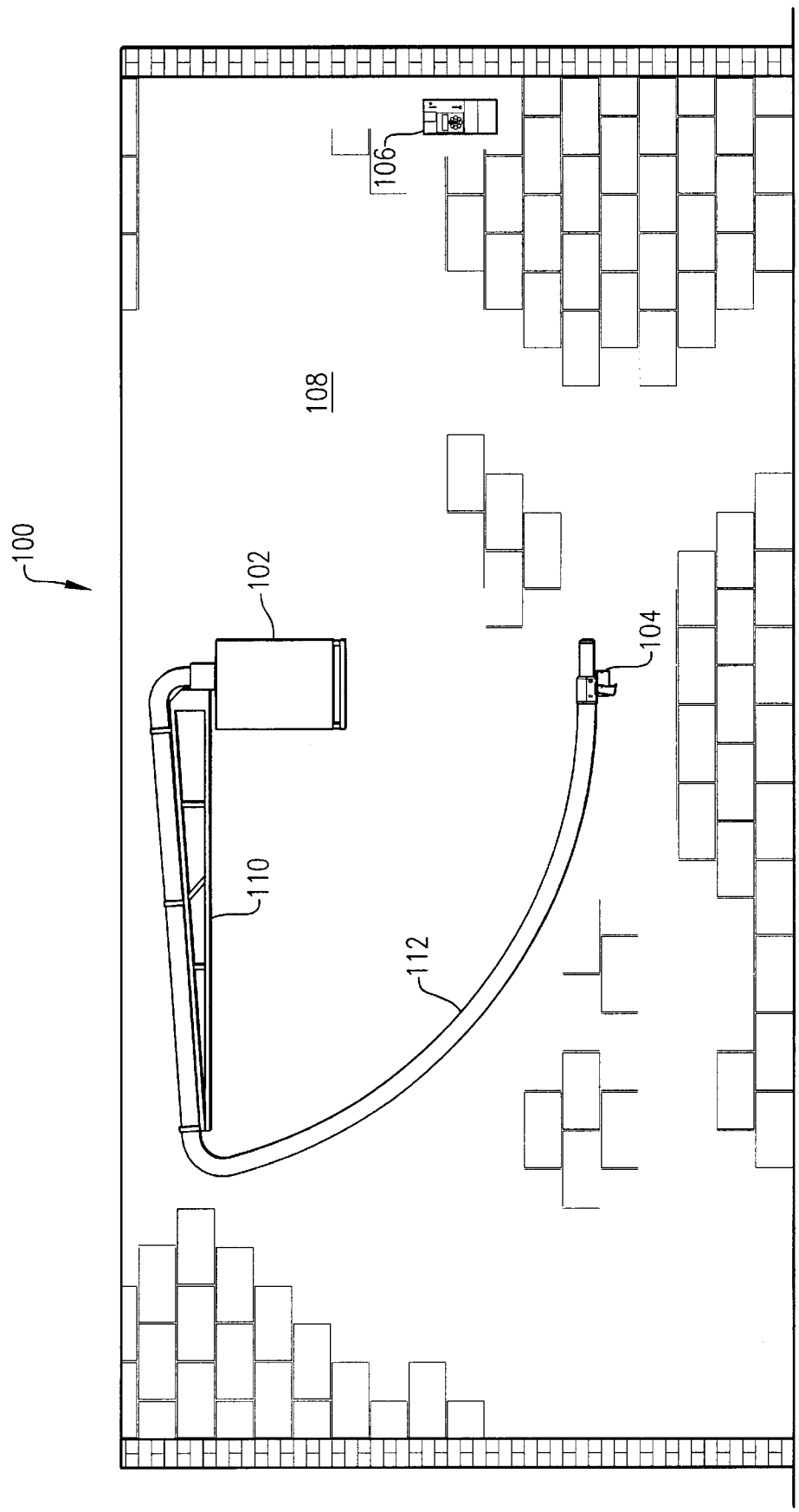
FIG. 10 is a side view of an alternative vehicle blow-drying device mounted on a vertical wall.

Referring to FIG. 10, a vehicle blow-drying device 100 similar to the vehicle blow-drying device described above with reference to FIGS. 1–9 is illustrated. However, support housing 102, holster 104, and timer control assembly 106 of vehicle blow-drying device 100 are supported on a vertical structural wall 108 rather than a pole (as shown in FIGS. 1 and 2). In such a configuration, it is preferred for the resting position of boom 110 to be substantially parallel to the surface of wall 108 so that vehicles can drive past wall 108 without contacting air supply hose 112.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A manually operated blow-drying device for drying a vehicle, said blow-drying device comprising:
    an overhead support assembly;
    a hose coupled to the support assembly and extending generally downwardly therefrom;
    a blower fluidically coupled to a base end of the hose and operable to force air through the hose and out of a distal end of the hose; and
    a handle coupled to the distal end of the hose and operable to aid in manual manipulation of the hose,
    said support assembly including an elongated boom and a support housing,
    said elongated boom being pivotally coupled to the support housing,
    said support housing defining a protected interior space,
    said blower being received in the protected interior space,
    said boom being rotatable relative to the support housing on a boom pivot axis,
    said boom pivot axis being skewed from vertical by a tilt angle in the range of from about 1 degree to about 5 degrees.

2. A blow-drying device according to claim 1,
    said handle being rotatable relative to the distal end of the hose.

3. A blow-drying device according to claim 1; and
    a heater coupled to the blower and operable to heat the air forced through the hose.

4. A blow-drying device according to claim 1,
    said tilt angle being about 2 degrees.

5. A blow-drying device according to claim 1,
    said boom extending substantially horizontally from the support housing,
    said boom being vertically positioned higher than the vehicle.

6. A blow-drying device according to claim 5,
    said support housing being vertically positioned higher than the vehicle.

7. A blow-drying device according to claim 1, said boom and said support housing being coupled to one another via a flow-through swivel joint, said flow-through swivel joint including a first member rigidly coupled to the support housing and a second member rigidly coupled to the boom, said first member defining a flow-through opening for allowing the air forced through the hose to flow through the first member.

8. A blow-drying device according to claim 7, said base end of the hose being coupled to the second member, said hose extending along and being coupled to the boom.

9. A blow-drying device according to claim 1, said support housing being rigidly coupled to an upright support structure rigidly coupled to the ground.

10. A vehicle cleaning system comprising:

a support housing defining a protected interior space and an outlet opening;

an air displacement assembly received in the protected interior space and operable to displace air through the outlet opening;

a flow-through swivel joint having an open inner collar, a concentric outer collar, and a ball bearing, said open inner collar being rigidly coupled to the support housing and positioned over the outlet opening so that air flowing through the outlet opening flows through the inner collar, said outer collar being concentrically disposed generally around the inner collar, said ball bearing being positioned generally between the inner and outer collars and operable to reduce frictional resistance to the rotation of the outer collar relative to the inner collar;

an elongated overhead boom having a proximal boom end rigidly coupled to the outer collar and a distal boom end laterally spaced from the support housing; and a hose having an attached portion coupled to and extending along the boom and a detached portion extending generally downwardly from the distal boom end, said hose being in fluid flow communication with the outlet opening, said inner and outer collars being rotatable relative to one another on a boom pivot axis, said boom pivot axis being skewed from vertical by a tilt angle in the range of from about 1 degree to about 5 degrees.

11. A vehicle cleaning system according to claim 10, said outer collar having a generally cylindrical inner surface, said inner collar having a generally cylindrical outer surface, said inner and outer surfaces including corresponding grooves that cooperatively define a bearing race for receiving the ball bearing.

12. A vehicle cleaning system according to claim 11, said outer collar including a bearing opening for inserting the bearing into the bearing race.

13. A vehicle cleaning system according to claim 12; and a cap screw threadably received in the bearing opening and operable to keep the ball bearing from exiting the bearing race via the bearing opening.

14. A vehicle cleaning system according to claim 10, said tilt angle being about 2 degrees.

15. A vehicle cleaning system according to claim 10, said boom being supported only by the support housing.

16. A vehicle cleaning system according to claim 10, said support housing and said boom being vertically positioned higher than the vehicle.

17. A vehicle cleaning system according to claim 10, said air displacement assembly including a centrifugal fan and an electric motor, said centrifugal fan including a fan housing and a fan blade assembly, said electric motor being operable to rotate the fan blade assembly relative to the fan housing.

18. A vehicle cleaning system according to claim 10; and a heater positioned proximate the outlet opening and operable to heat the air flowing through the outlet opening.

* * * * *